US012281687B2

(12) United States Patent
Olsson et al.

(10) Patent No.: US 12,281,687 B2
(45) Date of Patent: Apr. 22, 2025

(54) SHOCK ABSORBER DEVICE AND VEHICLE COMPRISING SUCH A SHOCK ABSORBER DEVICE

(71) Applicant: Volvo Truck Corporation, Gothenburg (SE)

(72) Inventors: Anders Olsson, Torslanda (SE); Yogesh Ramachandra, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/727,075

(22) PCT Filed: Jan. 17, 2022

(86) PCT No.: PCT/EP2022/050902
§ 371 (c)(1),
(2) Date: Jul. 6, 2024

(87) PCT Pub. No.: WO2023/134875
PCT Pub. Date: Jul. 20, 2023

(65) Prior Publication Data
US 2025/0075770 A1    Mar. 6, 2025

(51) Int. Cl.
*F16F 9/56* (2006.01)
*B60G 17/06* (2006.01)

(52) U.S. Cl.
CPC ............... *F16F 9/56* (2013.01); *B60G 17/06* (2013.01); *B60G 2202/44* (2013.01); *F16F 2230/30* (2013.01)

(58) Field of Classification Search
CPC ........ F16F 9/56; F16F 2230/30; B60G 17/06; B60G 2202/44
See application file for complete search history.

(56) References Cited

U.S. PATENT DOCUMENTS 3,784,218 A * 1/1974 Stone ..................... B60P 3/32
280/43.23
5,700,026 A 12/1997 Zalewski et al.
(Continued)

FOREIGN PATENT DOCUMENTS

| EP | 1582383 A1 | 10/2005 |
|---|---|---|
| FR | 3020992 A1 | 11/2015 |
| KR | 20240116193 A * | 7/2024 |

OTHER PUBLICATIONS

International Search Report and Written Opinion for International Patent Application No. PCT/EP2022/050902, mailed Jul. 4, 2022, 12 pages.

*Primary Examiner* — Toan C To
(74) *Attorney, Agent, or Firm* — Withrow & Terranova, PLLC

(57) ABSTRACT

A shock absorber device for a vehicle, the shock absorber device comprising a shock absorber and a lifting device, the lifting device being configured to adjust a length of the shock absorber along the axis between a second length and the first length, the second length being less than the first length, wherein the lifting device has a released configuration wherein the lifting device allows the first part and the second part to axially move with regard to each other along the axis and an engaged configuration wherein the lifting device axially couples the first part and the second part together.

15 Claims, 3 Drawing Sheets

(56) References Cited

U.S. PATENT DOCUMENTS

| | | | | |
|---|---|---|---|---|
| 8,596,430 B2* | 12/2013 | Ogawa | ................... | B60G 17/06 |
| | | | | 280/124.108 |
| 2009/0224502 A1* | 9/2009 | Yamawaki | ........... | B60G 17/021 |
| | | | | 280/124.108 |
| 2011/0278778 A1* | 11/2011 | Qattan | ...................... | F16F 3/00 |
| | | | | 267/171 |
| 2023/0227117 A1* | 7/2023 | Olsson | ...................... | F16F 9/56 |
| | | | | 280/6.151 |
| 2024/0174041 A1* | 5/2024 | Szymanski | ........ | B60G 17/0152 |

* cited by examiner

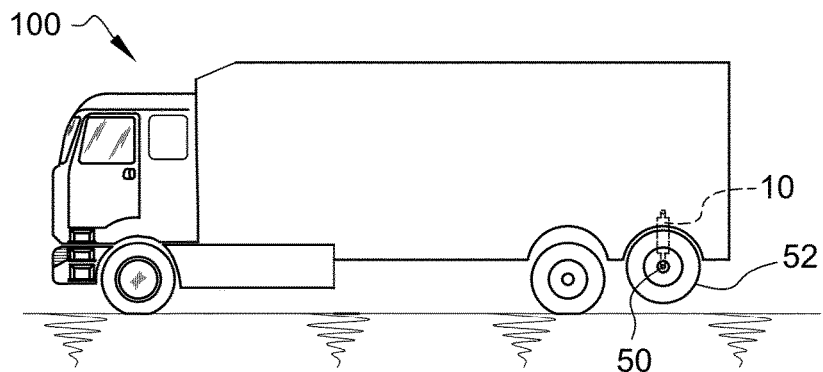
Fig. 1
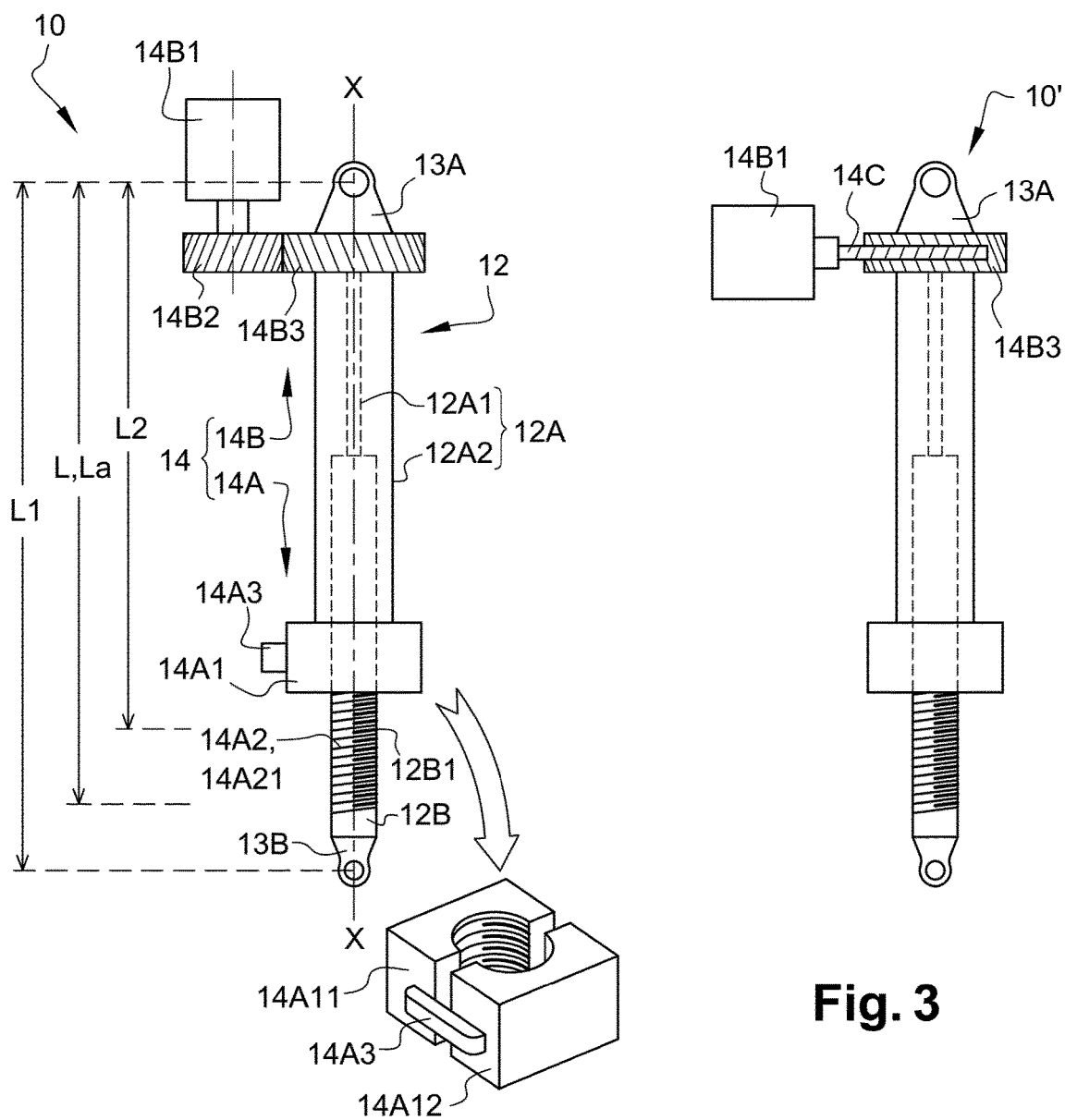
Fig. 2
Fig. 3

Fig. 4A
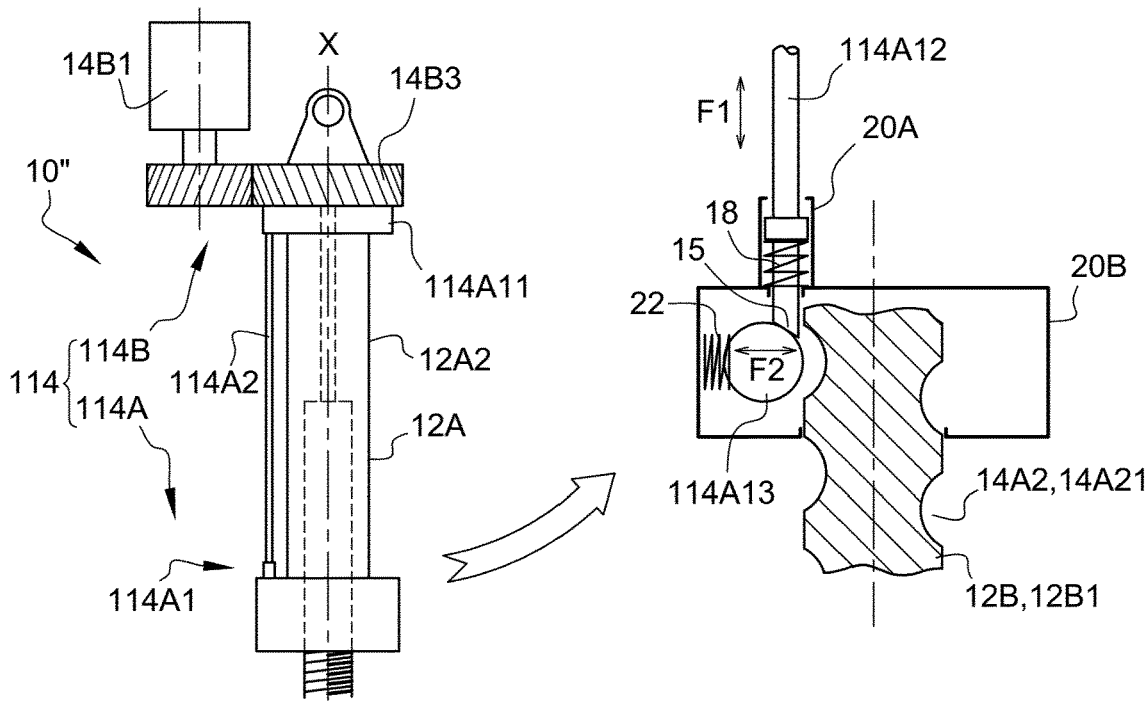
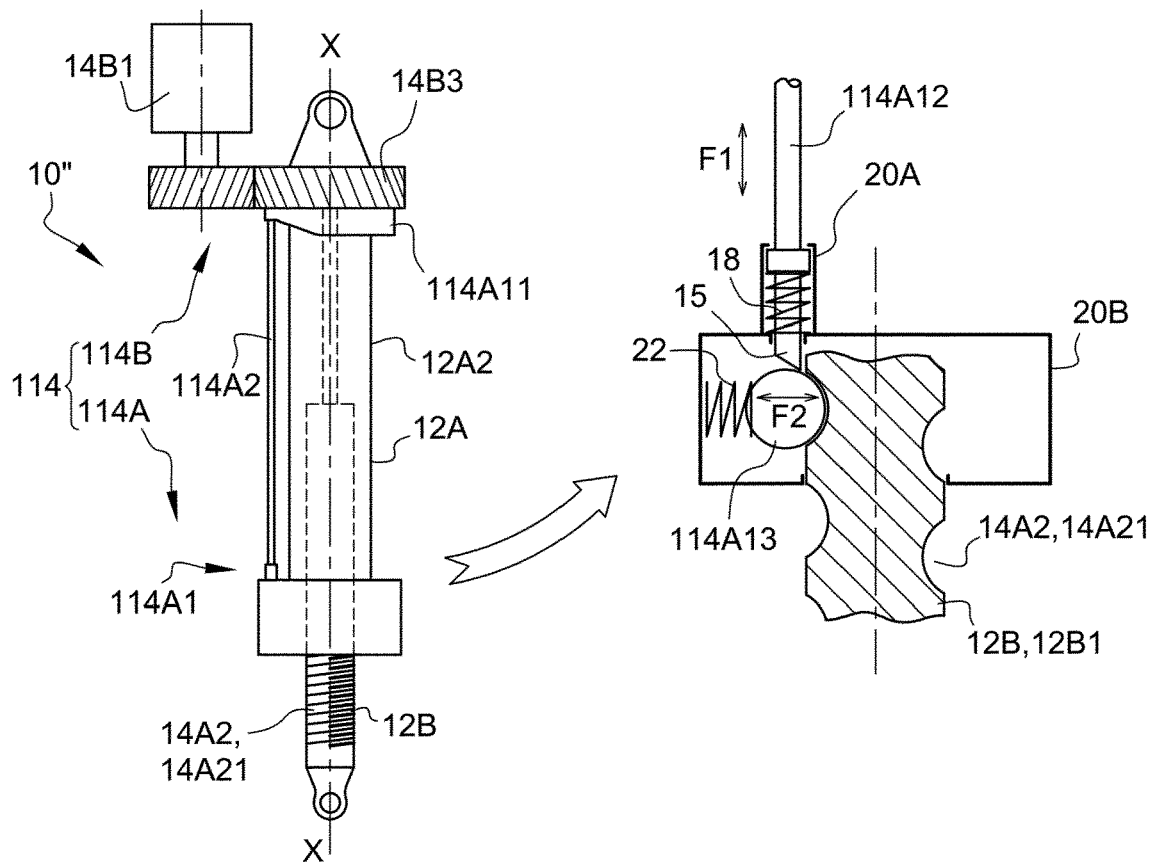
Fig. 4B

SHOCK ABSORBER DEVICE AND VEHICLE COMPRISING SUCH A SHOCK ABSORBER DEVICE

This application is a 35 USC 371 national phase filing of International Application No. PCT/EP2022/050902, filed Jan. 17, 2022, the disclosure of which is incorporated herein by reference in its entirety.

TECHNICAL FIELD

The invention relates to a shock absorber device and to a vehicle provided with such a shock absorber device. For example, the invention may be applied in heavy-duty vehicles, such as trucks, buses and construction equipment, but not necessarily.

BACKGROUND

In heavy truck suspensions, generally, there is a need to lift one or several of the truck axles, either when the load of the truck is low to save fuel and tyre wear or to increase ground pressure for increased traction of the axles remaining on the ground. However, traditional solutions are usually complex, large and heavy.

SUMMARY

An object of the invention is to provide a device configured to lift one or several truck axles, which is simple, space saving and/or light.

Such an object is achieved by a shock absorber device for a vehicle comprising a shock absorber extending along an axis and a lifting device, the shock absorber comprising a first part and a second part axially movable with regard to each other along the axis and having a first length along the axis in a rest position, the lifting device being mounted onto the shock absorber and being configured to adjust a length of the shock absorber along the axis between a second length and the first length, the second length being less than the first length, wherein the lifting device has a released configuration wherein the lifting device allows the first part and the second part to axially move with regard to each other along the axis and an engaged configuration wherein the lifting device axially couples the first part and the second part together.

Due to this configuration, the lifting device and the shock absorber may be integrated together in a simple way. This may render such a shock absorber device simple, space saving and/or may help to reduce the weight relative to the devices of the prior art.

For example, the first length may be the length of the shock absorber when mounted onto a vehicle, the vehicle being empty (i.e. unloaded). In another example, the first length may be maximum length of the shock absorber when not mounted onto a vehicle. The second length may be the minimal length of the shock absorber when totally compressed (i.e. maximum stroke).

For example, the second length may be strictly less than the first length. For example, the difference between the first length and the second length may lie in a range of 5 cm to 20 cm.

In the released configuration, the shock absorber is axially free (i.e. is not axially constrained/blocked) relative to the lifting device and may damp any potential shocks, as usual. In the engaged configuration, the lifting device cooperates with the shock absorber in order to axially couple the first and second parts of the shock absorber and to compress the shock absorber, i.e. reduce the axial length of the shock absorber, and an axle may be lifted. The other degrees of freedom than the axial movements may be blocked or not.

According to one embodiment, in the engaged configuration, the lifting device may mechanically axially couple the first part and the second part together.

According to a further embodiment, the lifting device may comprise an engaging system configured to reversibly axially couple the first part and the second part.

The engaging system may be configured to operate a movable portion in order to couple/uncouple the first part and the second part.

For example, the engaging system may comprise a mechanical control device e.g. comprising a cam and a rod or the like; an electrical control device e.g. comprising a solenoid, an electromagnet, or the like, etc.

According to a further embodiment, the lifting device may comprise a first element and a second element, the first part of the shock absorber being provided with the first element and the second part of the shock absorber being provided with the second element, the first element and the second element being reversibly engageable with each other.

The first/second element may be mounted or formed onto the first/second part, respectively. According to a further embodiment, one element among the first element and the second element may comprise a driving device and the other element among the first element and the second element may comprise a driven device, the driving device and the driven device being configured to cooperate together by form-fitting.

For example, the driving device may comprise a pinion, a tapping, a ball, a needle etc. For example, the driven device may comprise a rack, a helical path (i.e. filet, threading, tapping of any shape or the like), etc. For example, the engaging system may be configured to engage/disengaged the driving device and the driven device.

According to a further embodiment, the lifting device may comprise a motor, for example an electric motor, an air driven motor or a hydraulic driven motor, configured to drive the driving device.

The motor may be configured to be mounted onto the vehicle or onto a portion of the shock absorber device. Such a motor may be electrically/air/hydraulically powered by any source already provided in the vehicle.

According to a further embodiment, the driven device may comprise a rack or a helical path.

The helical path may be a filet, a threading, a tapping of any shape or the like.

According to a further embodiment, the engaging system may be configured to reversibly engage the driving device and the driven device.

According to a further embodiment, the first part may comprise a piston rod.

According to a further embodiment, the first element may be at least in part mounted onto a dust cover of the piston rod.

According to a further embodiment, the dust cover may be rotatable relative to the second part around the axis.

The dust cover may be configured to also rotate relative to the piston rod, but not necessarily.

According to a further embodiment, the driving device may be mounted onto the dust cover and the motor may be configured to rotate the dust cover around the axis.

According to a further embodiment, the second part may comprise a stator. A stator is also known by the skilled person as "shock absorber outer tube".

According to a further embodiment, the rack or the helical path may be arranged on an outer face of the stator.

An embodiment relates to a vehicle comprising the shock absorber device according to any one of the embodiments of the present disclosure.

All or part of the above features, considered alone or in combination, may contribute to the provision of a simple, compact and/or light structure.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 show a truck equipped with a shock absorber device,

FIG. 2 shows a first embodiment of a shock absorber device,

FIG. 3 shows a variant of the first embodiment,

FIGS. 4A and 4B show a second embodiment of a shock absorber device,

DETAILED DESCRIPTION OF EXAMPLE EMBODIMENTS OF THE INVENTION

Figure 5:
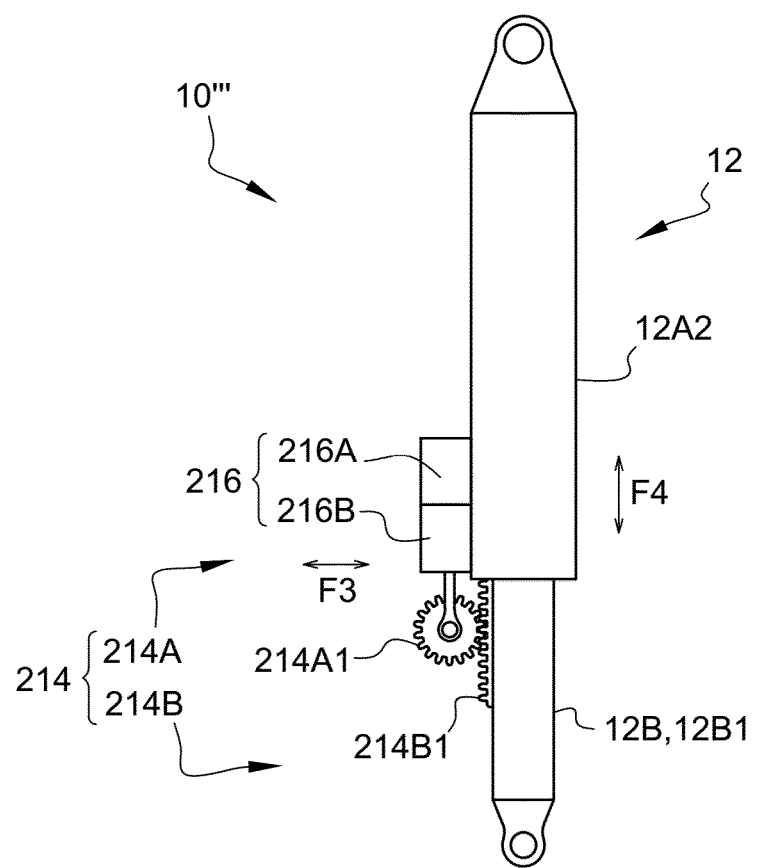
FIG. 5 shows a third embodiment of a shock absorber device.

FIG. 1 shows a vehicle 100, in the present example a truck, provided with wheels 52, in this example rear wheels, mounted on an axle 50. The axle 50 may be mounted onto a chassis of the vehicle 100 via one or several shock absorber devices 10. In this respect, the vehicle 100 may comprise as many shock absorber devices 10 as traditional dampers or the like usually used to mount the axle 50 on the chassis of the vehicle 100, in replacement of said traditional dampers or the like, or a mix of shock absorber device(s) 10 and of traditional dampers or the like.

FIG. 2 shows a shock absorber device 10 comprising a shock absorber 12 extending along an axis X and a lifting device 14. The shock absorber 12 comprises a first part 12A and a second part 12B axially movable with regard to each other along the axis X. The shock absorber 12 may have a first length L1 along the axis X in a rest position. The lifting device 14 is mounted onto the shock absorber 12 and is configured to adjust a length L of the shock absorber 12 along the axis X between a second length L2 and the first length L1, the second length L2 being less than the first length L1. In the present example, the length L, L1, L2 may be measured between reference points (e.g. geometric centre of mounting through holes) of the mounting portions 13A and 13B. In the present example, the first length L1 is the length of the shock absorber 12 when mounted onto the vehicle 100, the vehicle 100 being empty (i.e. unloaded). In the present example, the second length L2 is the minimal length of the shock absorber 12 when totally compressed (i.e. maximum stroke). The lifting device 14 has a released configuration wherein the lifting device 14 allows the first part 12A and the second part 12B to axially move with regard to each other along the axis X and an engaged configuration wherein the lifting device 14 axially couples the first part 12A and the second part 12B together.

In the present example, the shock absorber 12 is a damper, the first part 12A comprising a piston rod 12A1 and a dust cover 12A2 (i.e. dust cover of the piston). The second part 12B comprises a stator 12B1. The dust cover 12A2 is rotatable relative to the second part 12B, and in this example relative to the stator 12B1, around the axis X. The dust cover 12A2 is also rotatable relative to the piston rod 12A1 around the axis X.

In the present example, the lifting device 14 is configured to mechanically axially couple the first part 12A and the second part 12B. In the present example, the first part 12A and the second part 12B are free to rotate relative to each other around the axis X when coupled with the help of the lifting device 14.

In the present example, the lifting device 14 comprises an engaging system 14A configured to reversibly axially couple the first part 12A and the second part 12B. The lifting device 14, in this example the engaging system 14A, also comprises a first element 14A1 provided on the first part 12A, in this example on the dust cover 12A2, and a second element 14A2 provided on the second part 12B, in this example on the stator 12B1. The first element 14A1 and the second element 14A2 are reversibly engageable with each other.

In this example, the first element 14A1 comprises two half nuts 14A11 and 14A12, which may form all or part of a driving device, and the second element 14A2 comprise a helical path 14A21 which may form all or part of a driven device, the half nuts 14A11, 14A12 and the helical path 14A21 being configured to cooperate together by form-fitting. The first element 14A1, in this example the half-nuts 14A11, 14A12 may be coupled in rotation around the axis X with the first part 12A, in this example with the dust cover 12A2. In the present example, the helical path 14A21 is arranged on an outer face of the stator 12B1.

In a variant not shown, the helical path may be formed on an inner face of the dust cover 12A2 while complementary "half nuts" (with a thread on the outer face) may coupled in rotation with the stator 12B1. In such a case, the driving element would be the helical path and the driven element would be the "half nuts".

In another variant not shown, the helical path 14A21 may be protected by a rubber boot/rubber bellows to prevent penetration of dirt and water.

In the present example, the engaging system 14A is configured to reversibly engage the half nuts 14A11, 14A12 and the helical path 14A21. The engaging system 14A may comprises an electrical control device 14A3 including a solenoid, an electromagnet, or the like (not shown) to clamp/release the two half nuts 14A11, 14A12 with the helical path 14A21.

When the half nuts 14A11, 14A12 are clamped, the half nuts 14A11, 14A12 are engaged with the helical path 14A21 by form fitting. The first part 12A and the second part 12B are then axially coupled with each other along the axis X. The lifting device 14 may be considered to be in the engaged configuration, and axially couples the first part 12A and the second part 12B together along the axis X.

When the half nuts 14A11, 14A12 are released, the half nuts 14A11, 14A12 are disengaged from the helical path 14A21 by form fitting. The first part 12A and the second part 12B are free to axially move with regard each other along the axis X. The lifting device 14 may be considered to be in a released configuration, and allows the first part 12A and the second part 12B to axially move with regard to each other along the axis X.

In the present example, the lifting device 14 comprise a motor 14B1, for example an electric motor, an air driven motor or a hydraulic driven motor, configured to drive the half nuts 14A11, 14A12. The motor 14B1 may be part of a driving system 14B including, in addition to the motor 14B1, several gears 14B2, 14B3, in this example two gears. The motor 14B1 may be mounted on a part of the vehicle 100, for example a part on which the mounting part 13A is mounted. The gear 14B2 is driven by the motor 14B1 and is meshed with the gear 14B3, which is coupled in rotation with the first part 12A, in this example the dust cover 12A2. The rotation of the dust cover 12A2 via the motor 14B1 thus drives the half nuts 14A11, 14A12, which are coupled in rotation with the dust cover 12A2. The half nuts 14A11, 14A12 then drive the helical path 14A21 and the axial length L of the shock absorber may be thus adjusted.

In the engaged configuration, i.e. when the half nuts 14A11, 14A12 are engaged with the helical path 14A21, and when the motor 14B1 is operated in a first rotating direction, the length L of the shock absorber 12 along the axis X may be adjusted from its rest position, for example between the second length L2 and the first length L1 in order to lift the axle 50 of the vehicle 100, as shown in FIG. 1. When an appropriate length La has been set, the lifting device 14 may rest in the engaged configuration in order to block the shock absorber 12 (i.e. to maintain the axial coupling between the first part 12A and the second part 12B), and thus block the axle 50 in the lifted position. When the motor 14B1 is operated in a second rotating direction, opposed to the first rotating direction, the length L may be adjusted in order to move back to the rest position of the shock absorber 12. The axle 50 may be thus lowered and the wheels 52 may contact again the road. The half nuts 14A11, 14A12 may be then disengaged from the helical path 14A21 and the lifting device 14 set in the released configuration. The first part 12A and the second part 12B are thus axially free relative to each other and the shock absorber 12 may be used as usual, for its damping function.

In a variant 10' of the first embodiment, shown in FIG. 3, the gear 14B3 may be replaced by a worm gear 14C and the arrangement of the motor 14B1 adapted accordingly. The rest of the shock absorber device 10' is identical to the shock absorber device 10 and not described again. It may be referred to the description of the first embodiment in this respect. In a second embodiment 10" of the shock absorber device is shown in FIGS. 4A and 4B. The shock absorber device 10" of the second embodiment is similar to the shock absorber device of the first embodiment 10, only the engaging systems differ. The parts which are similar are not described again and it may be refered to the description of the first embodiment in this respect.

The lifting device 114 comprises an engaging system 114A and a driving system 14B, similar to the one of the first embodiment. The engaging system 114A comprises a first element 114A1 provided on the first part 12A, in this example the dust cover 12A2, and a second element 14A2, similar to the second element of the first embodiment 10. The first element 114A1 and the second element 14A2 are reversibly engageable with each other. In this example, the first element 114A1 comprises a cam 114A11, a rod 114A12, and engaging element 114A13, in the present example a ball. This may form a mechanical control device of the engaging system 114A.

The cam 114A11 is rotatable around the axis X, and is coupled in rotation with the gear 14B3. The cam 114A11 is configured, when rotated, to axially move the rod 114A12 along the axis X between a first position (see FIG. 4A) and a second position (see FIG. 4B). Due to an appropriate clutch (not shown), known as such by the skilled person, the gear 14B3 is configured to sequentially rotate the cam 114A11 and the dust cover 12A2. Therefore, due to such a clutch, when the cam 114A11 is rotated (by the gear 14B3), the dust cover 12A2 is not rotated (by the gear 14B3), and when the dust cover 12A is rotated (by the gear 14B3), the cam 114A11 is not rotated (by the gear 14B3). In this example, the rod 114A12, the ball 114A13 and the casings 20A, 20B may be coupled in rotation with the dust cover 12A2 and are rotated together with the dust cover 12A2 when the dust cover 12A2 is rotated around the axis X The rod 114A12 extends along the axis X between the cam 114A11 and the ball 114A13. The rod 114A12 may permanently contact both the ball 114A13 and the cam 114A11, but not necessarily. A distal end 15 of the rod 114A12 may cooperate with the ball 114A13 in order to radially move the ball 114A13 (i.e. move the ball 114A13 along an axis perpendicular to the axis X). When the cam 114A11 is rotated around the axis X, the rod 114A12 is moved along the axis X as shown by the double arrow F1, in one direction or in the other direction opposite to the one direction. A return spring 18, disposed in a casing 20A through which the rod 114A12 extends, is configured to push the rod 114A12 axially toward the cam 114A11 so that the rod 114A12 permanently bears against the cam 114A11.

The ball 114A13 is housed in a casing 20B, adjacent to the casing 20A, and in which the distal end 15 of the rod 114A12 extends. A return spring 22, disposed in the casing 20B pushes radially the ball 114A13 toward the first part 12B, in order the engage to ball 114A13 with the helical path 14A21. Due to the axial movement of the rod 114A12 according to the arrow F1 the ball 114A13 may be moved radially as shown by the double arrow F2, in one direction or in the other direction opposite to the one direction. In other words, the rod 114A12 is configured to push the ball 114A13 radially away from the first part 12B, in order to disengage to ball 114A13 from the helical path 14A21 (see FIG. 4A), or to free (or partially free) the ball 114A13 to be pushed by the return spring 22 toward the first part 12B, and to engage to ball 114A13 with the helical path 14A21 (see FIG. 4B).

In the present example, the ball 114A13 may form all or part of a driving device while the helical path 14A21 may form all or part of a driven device. In the configuration shown in FIG. 4A, the ball 114A13 is disengaged form the helical path 14A21 and the lifting device 114 may be considered to be in the released configuration. When the motor 14B1 is operated in a first rotating direction, the gear 14B3 is driven. Due to the clutch between the gear 14B3 on one side and the cam 114A11 and the dust cover 12A2 on the other side, the cam 114A11 is rotated first together with the gear 14B3 while the dust cover 12A2 is not rotated. The rotation of the cam 114A11 allows the rod 114A12, by following the cam path, to move axially (upwardly in FIGS. 4A and 4B) due to the return spring 18. This movement frees the ball 114A13 which is thus moved radially by the return spring 22 and engaged with the helical path 14A21, as shown in FIG. 4B. Then, still due to the clutch between the gear 14B3 on one side and the cam 114A11 and the dust cover 12A2 on the other side, the motor 14B1 being still operated, the dust cover 12A2 starts to rotate together with the gear 14B3 while the cam 114A11 is not rotated anymore. Due to the engagement of the ball 114A13 with the helical path 14A21, the ball 114A13 being coupled in rotation with the dust cover 12A2, the length L of the shock absorber 12 along the axis X may be adjusted from its rest position, for example between the second length L2 and the first length L1 in order to lift the axle 50 of the vehicle 100, as shown in FIG. 1. When an appropriate length La has been set, the lifting device 14 remains in the engaged configuration and blocks the shock absorber 12 (i.e. to maintain the axial coupling between the first part 12A and the second part 12B), and thus block the axle 50 in the lifted position. When the motor 14B1 is operated in a second rotating direction, opposed to the first rotating direction, only the dust cover 12A2 is rotated (and not the cam 114A11) and the length L may be adjusted in order to move back to the rest position of the shock absorber 12. The axle 50 may be thus lowered and the wheels 52 may contact again the road. Then due to the clutch, the cam 114A11 starts to rotate together with the gear 14B3 while the dust cover 12A2 is not rotated anymore. The rod 114A12 is then pushed downward (in FIGS. 4A and 4B) and pushes the ball 114A13 radially outward which is then disengaged from the helical path 14A21. The first part 12A and the second part 12B are thus axially free relative to each other and the shock absorber 12 may be used as usual, for its damping function.

In a variant not shown, the ball 114A13 and related parts may be replaced by the two half nuts 14A11, 14A12 of the first embodiment, the rod 114A11 being configured to clamp/release the two half nuts 14A11, 14A12 with the helical path 14A21.

In a third embodiment 10''' of the shock absorber device is shown in FIG. 5. The shock absorber device 10''' of the third embodiment is similar to the shock absorber device of the first embodiment 10, and only the lifting device differs. The parts which are similar are not described again and it may be referred to the description of the first embodiment in this respect.

The lifting device 214 comprises a first element 214A, which may comprise in this example a pinion 214A1, and a second element 214B, which may comprise in this example a rack 214B1, and which are reversible engageable with each other. The first element 214A is provided on the first part 12A, in this example on the dust cover 12A2. In the present example, the second element 214B is provided on the second part 12B, in this example on an outer face of the stator 12B1. The pinion 214A1 may form a driving device while the rack 214B1 may form a driven device. In the present example, the dust cover 12A2 and the stator 12B1 may be not rotatable relative to each other around the axis X, at least when coupled with the help of the lifting device 214.

A control system 216 of the lifting device 214 comprise an engaging system 216A and a driving system 216B. The control system 216 may be directly mounted onto the dust cover 12A2.

The engaging system 216A is configured to reversibly engage the pinion 214A1 and the rack 214B1, for example by moving the pinion 214A1 along the double arrow F3 on FIG. 5 in order to engage/disengage the pinion 214A1 with/from the rack 214B1. Such an engaging system is known as such by the skilled person and is not described in detail. It may comprise an electrical or a mechanical control device. When the pinion 214A1 is engaged with the rack 214B1, the lifting device 214 may be considered to be in an engaged configuration. When the pinion 214A1 is disengaged from the rack 214B1, the lifting device 214 may be considered to be in a released configuration.

The driving system 216B comprises a motor (not shown), for example an electric motor, an air driven motor or a hydraulic driven motor, configured to drive the pinion 214A1. The motor may drive the pinion 214A1 directly or via a gearbox (not shown). Depending on the rotation of the pinion 214A1, the stator 12B1 may be moved along the axis X, in one direction or in the opposite direction of the one direction (see double arrow F4).

In the engaged configuration, i.e. when the pinion 214A1 is engaged with the rack 214B1, and when the driving system 216B is operated in a first rotating direction, the length L of the shock absorber 12 along the axis X may be adjusted from the rest position of the shock absorber 12, for example between the second length L2 and the first length L1 in order to lift the axle 50 of the vehicle 100, as shown in FIG. 1. When an appropriate length La has been set, the lifting device 214 may rest in the engaged configuration in order to block the shock absorber 12 (i.e. to maintain the axial coupling between the first part 12A and the second part 12B), and thus block the axle 50 in the lifted position. When the driving system 216B is operated in a second rotating direction, opposed to the first rotating direction, the length L may be adjusted in order to come back to the rest position of the shock absorber 12. The axle 50 may be thus lowered and the wheels 52 may contact again the road. The pinion 214A1 may be then disengaged from the rack 214B1 and the lifting device 14 set in the released configuration. The first part 12A and the second part 12B are thus axially free relative to each other and the shock absorber 12 may be used as usual, for its damping function.

It is to be understood that the present invention is not limited to the embodiments described above and illustrated in the drawings; rather, the skilled person will recognize that many changes and modifications may be made within the scope of the appended claims.

For example, the vehicle 100 may be provided with any of the shock absorber devices disclosed in the present disclosure, for example with the shock absorber device 10, 10', 10'', 10''' and any variants thereof.

The invention claimed is:

1. A shock absorber device for a vehicle, the shock absorber device comprising:
a shock absorber extending along an axis; and
a lifting device;
wherein the shock absorber comprises a first part and a second part axially movable with regard to each other along the axis and having a first length along the axis in a rest position;
wherein the lifting device is mounted onto the shock absorber and is configured to adjust a length of the shock absorber along the axis between a second length and the first length, the second length being less than the first length; and
wherein the lifting device has a released configuration wherein the lifting device allows the first part and the second part to axially move with regard to each other along the axis, and an engaged configuration wherein the lifting device axially couples the first part and the second part together.

2. The shock absorber device of claim 1, wherein, in the engaged configuration, the lifting device mechanically axially couples the first part and the second part together.

3. The shock absorber device of claim 1, wherein the lifting device comprises an engaging system configured to reversibly axially couple the first part and the second part.

4. The shock absorber device of claim 1, wherein the lifting device comprises a first element and a second element, the first part of the shock absorber being provided with the first element and the second part of the shock absorber being provided with the second element, the first element and the second element being reversibly engageable with each other.

5. The shock absorber device of claim 4, wherein one element among the first element and the second element comprises a driving device and the other element among the first element and the second element comprises a driven device, the driving device and the driven device being configured to cooperate together by form-fitting.

6. The shock absorber device of claim 5, wherein the lifting device comprises a motor, for example an electric motor, an air driven motor or a hydraulic driven motor, configured to drive the driving device.

7. The shock absorber device of claim 5, wherein the driven device comprises a rack or a helical path.

8. The shock absorber device of claim 3, wherein:
the lifting device comprises a first element and a second element, the first part of the shock absorber being provided with the first element and the second part of the shock absorber being provided with the second element, the first element and the second element being reversibly engageable with each other;
one element among the first element and the second element comprises a driving device and the other element among the first element and the second element comprises a driven device, the driving device and the driven device being configured to cooperate together by form-fitting; and
the engaging system is configured to reversibly engage the driving device and the driven device.

9. The shock absorber device of claim 1, wherein the first part comprises a piston rod.

10. The shock absorber device of claim 9, wherein:
the lifting device comprises a first element and a second element, the first part of the shock absorber being provided with the first element and the second part of the shock absorber being provided with the second element, the first element and the second element being reversibly engageable with each other; and
the first element is at least in part mounted onto a dust cover of the piston rod.

11. The shock absorber device of claim 10, wherein the dust cover is rotatable relative to the second part around the axis.

12. The shock absorber device of claim 6, wherein:
the first element is at least in part mounted onto a dust cover of the piston rod; and
the driving device is mounted onto the dust cover and the motor is configured to rotate the dust cover around the axis.

13. The shock absorber device of claim 1, wherein the second part comprises a stator.

14. The shock absorber device of claim 7, wherein:
the second part comprises a stator; and
the rack or the helical path is arranged on an outer face of the stator.

15. A vehicle comprising the shock absorber device of claim 1.

* * * * *